United States Patent
Shoyama

(10) Patent No.: US 8,325,252 B2
(45) Date of Patent: Dec. 4, 2012

(54) SOLID-STATE IMAGING DEVICE AND DATA PROCESSING DEVICE

(75) Inventor: Hideki Shoyama, Fukuoka (JP)

(73) Assignee: Sony Corporation, Tokyo (JP)

( * ) Notice: Subject to any disclaimer, the term of this patent is extended or adjusted under 35 U.S.C. 154(b) by 280 days.

(21) Appl. No.: 12/805,957

(22) Filed: Aug. 26, 2010

(65) Prior Publication Data

US 2011/0102650 A1 May 5, 2011

(30) Foreign Application Priority Data

Oct. 30, 2009 (JP) ................................ 2009-250010

(51) Int. Cl.
*H04N 5/217* (2006.01)
(52) U.S. Cl. ........................................ 348/246; 348/241
(58) Field of Classification Search .................. 348/241, 348/246, 247, 187
See application file for complete search history.

(56) References Cited

U.S. PATENT DOCUMENTS

| 7,755,680 | B2 * | 7/2010 | Watanabe | 348/247 |
| 2004/0044491 | A1 | 3/2004 | Yonaga et al. | |
| 2005/0062862 | A1 * | 3/2005 | Matsuyama et al. | 348/246 |
| 2006/0232691 | A1 * | 10/2006 | Watanabe | 348/246 |
| 2007/0040920 | A1 * | 2/2007 | Kinoshita | 348/246 |
| 2010/0007775 | A1 * | 1/2010 | Wang et al. | 348/241 |

FOREIGN PATENT DOCUMENTS

JP  2004-093421  3/2004

* cited by examiner

*Primary Examiner* — Tuan Ho
(74) *Attorney, Agent, or Firm* — Rader Fishman & Grauer, PLLC

(57) ABSTRACT

A solid-state imaging device includes: a pixel array unit formed by two-dimensionally disposing a plurality of pixels each having a photoelectric conversion portion; one or more SRAMs; a memory control section controlling writing of pixel data sequentially output from the pixel array unit into the SRAM and controlling readout of the pixel data from the SRAM; a correction process section performing a process of correcting the pixel data read from the SRAM by the memory control section; a defect detecting section detecting a defective address in the SRAM; and a defect relieving section holding pixel data to be written in the defective address of the SRAM by the memory control section and outputting the pixel data held therein to the correction process section instead of the pixel data which has been written in the defective address of the SRAM.

6 Claims, 4 Drawing Sheets

FIG.2
| | | | | | | | | | | | | |
|---|---|---|---|---|---|---|---|---|---|---|---|---|
| SRAM3 ··· | | G17 | G13 | | G07 | G03 | | R17 | R13 | | R07 | R03 |
| SRAM2 ··· | | G16 | G12 | | G06 | G02 | | R16 | R12 | | R06 | R02 |
| SRAM1 ··· | G19 | G15 | G11 | G09 | G05 | G01 | R19 | R15 | R11 | R09 | R05 | R01 |
| SRAM0 ··· | G18 | G14 | G10 | G08 | G04 | G00 | R18 | R14 | R10 | R08 | R04 | R00 |
| | 11 | 10 | 9 | 8 | 7 | 6 | 5 | 4 | 3 | 2 | 1 | 0 |
ADDRESS
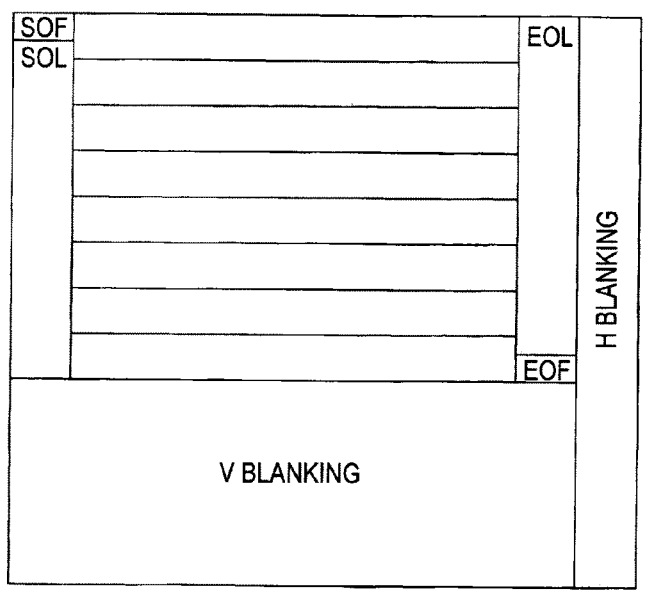
FIG.3
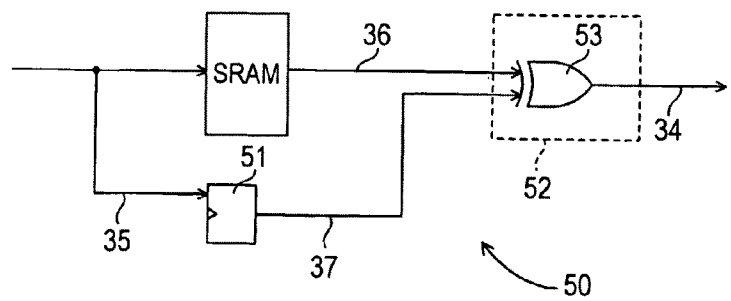
FIG.4

SOLID-STATE IMAGING DEVICE AND DATA PROCESSING DEVICE

BACKGROUND OF THE INVENTION

1. Field of the Invention

The present invention relates to a solid-state imaging device and a data processing device. More particularly, the invention relates to a solid-state imaging device and a data processing device having a memory to be used for a correction process.

2. Background of the Related Art

A solid-state imaging device used in a mobile telephone, a digital still camera, or the like has a memory to be used for a correction process. Various methods for testing such a memory have been proposed.

For example, JP-A-2004-93421 (Patent Document 1) discloses a method approach for detecting a defective part of a memory including the step of connecting a tester to the memory to test it based on control signals from the tester.

SUMMARY OF THE INVENTION

When a test is carried out as disclosed in Patent Document 1, the problem of a cost increase arises because a tester must be used. Further, since such a test is carried out before the shipment of products, another problem arises in that defects cannot be detected when they occur after the shipment of products.

According to an embodiment of the invention, there is provided a solid-state imaging device including a pixel array unit formed by two-dimensionally disposing a plurality of pixels each having a photoelectric conversion portion, one or more SRAMs, a memory control section controlling writing of pixel data sequentially output from the pixel array unit into the SRAM and controlling readout of the pixel data from the SRAM, a correction process section performing a process of correcting the pixel data read from the SRAM by the memory control section, a defect detecting section detecting defective address in the SRAM, and a defect relieving section holding pixel data to be written in the defective address of the SRAM by the memory control section and outputting the pixel data held therein to the correction process section instead of the pixel data which has been written in the defective address of the SRAM. The defect detecting section includes a pixel data holding portion used for detecting a defect which temporarily holds the pixel data to be written in the SRAM and a detector detecting the defective address of the SRAM when the pixel data read from the SRAM and the pixel data read from the pixel data holding portion for detecting a defect do not agree with each other.

The solid-state imaging device may include a plurality of the SRAMs, and the defect detecting section and the defect relieving section may be provided in association with each of the SRAMs.

The solid-state imaging device may include m+1 (m is 3 or a greater integer) SRAMs. The memory control section may read pixel data from m SRAMs among the m+1 SRAMs and may write pixel data in the remaining one SRAM simultaneously, and the correction process section may perform the correction process based on pixel data read from m−1 SRAMs and one piece of pixel data supplied from the pixel array unit.

In the solid-state imaging device, the memory control section may write pieces of pixel data of lines of the pixel array unit in the m+1 SRAMs starting with pixel data in a 0-th column, the pieces of data being written one after another sequentially and cyclically in the first to (m+1)-th SRAMs. The memory control section may read out the pieces of pixel data written in the m+1 SRAMs starting with the pixel data in the 0-th column, the pieces of data being read out, one after another sequentially and cyclically from the first to (m+1)-th SRAMs.

In the solid-state imaging device, the detector of the defect detecting section may output a defect detection signal to the defect relieving section when the pixel data read out from the SRAM and the pixel data read out from the pixel data holding portion for detecting a defect do not agree with each other. The defect relieving section may include a defective address holding portion holding the address in the SRAM which is being read by the memory control section when the defect detection signal is output by the defect detecting section as a defective address, a pixel data holding portion for relieving a defect, which holds pixel data to be written in the defective address of the SRAM by the memory control section, a selecting portion selectively outputting the pixel data read out from the SRAM or the pixel data read out from the pixel data holding portion for relieving a defect to the image processing unit, and a control portion reading the pixel data in the pixel data holding portion when pixel data in the defective address of the SRAM is read out by the memory control section and controlling the selecting portion to cause it to output the pixel data read out from the pixel data holding portion to the correction process section.

According to another embodiment of the invention, there is provided a data processing device including an SRAM, a memory control section controlling writing of pixel data into the SRAM and readout of the pixel data from the SRAM, a defect detecting section detecting a defective address in the SRAM, and a defect relieving section holding pixel data to be written in the defective address of the SRAM by the memory control section and outputting the pixel data held therein to the correction process section instead of the pixel data which has been written in the defective address of the SRAM. The defect detecting section includes a pixel data holding portion for detecting a defect which temporarily holds pixel data to be written in the SRAM and a detector detecting a defective address of the SRAM when pixel data read out from the SRAM and pixel data read out from the pixel data holding portion for detecting a defect do not agree with each other.

According to the embodiments of the invention, there is provided a solid-state imaging device and a data processing device capable of detecting a defect in a memory effectively.

BRIEF DESCRIPTION OF THE DRAWINGS

FIG. 2 is an illustration showing a configuration of a memory unit and an order in which pieces of pixel data are stored;

FIG. 3 is an illustration showing a data structure of pixel data generated by a synchronization code adding section;

FIG. 4 is a diagram showing a specific configuration of a defect detecting section;

DESCRIPTION OF THE PREFERRED EMBODIMENTS

Modes for implementing the invention (hereinafter referred to as embodiments) will now be described in the following order.
1. First Embodiment
2. Second Embodiment
3. Modifications

1. First Embodiment

A solid-state imaging device according to a first embodiment of the invention will now be described with reference to the drawings.

[1-1. Configuration of Solid-State Imaging Device]

Figure 1:
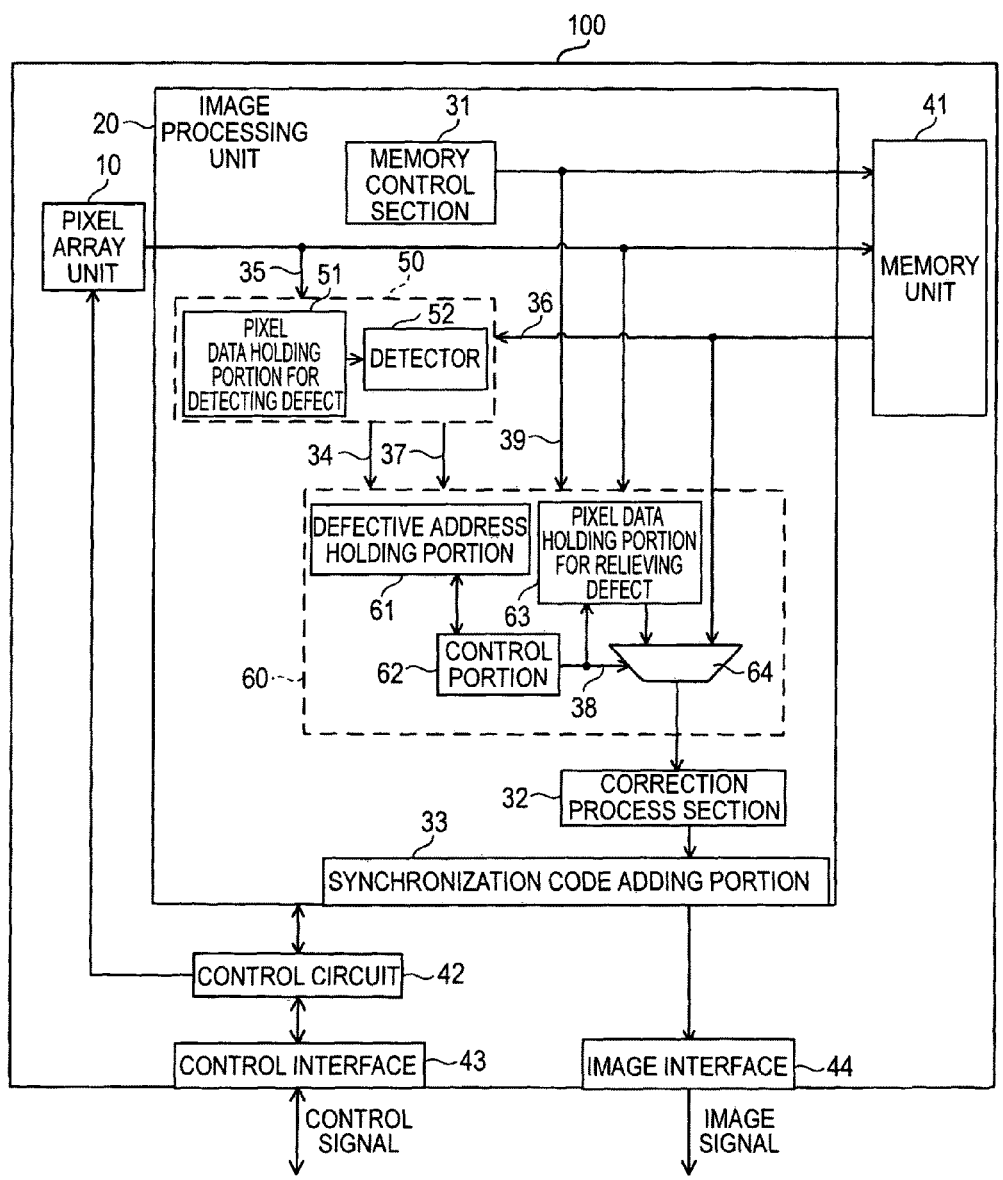
FIG. 1 is a diagram showing a configuration of a solid-state imaging device according to an embodiment of the invention.

As shown in FIG. 1, a solid-state imaging device 100 of the present embodiment includes a pixel array unit 10, an image processing unit 20, a memory unit 41, a control circuit 42, a control interface 43, and an image interface 44.

The pixel array unit 10 is formed by two-dimensionally disposing a plurality of pixels each having a photoelectric conversion portion. At the pixel array unit 10, light from an object acquired through a lens (not shown) is photo-electrically converted by the plurality of pixels to accumulate electrical charge at each of the pixels according to the light impinging on the same. The pixel array unit 10 reads the electrical charge accumulated at each pixel and outputs it to the image processing unit 20 as pixel data through an A/D conversion portion provided therein.

In the present embodiment, the pixel array unit 10 has n×m pixels disposed in the form of a matrix. That is, the pixel array unit 10 has 0-th to (n−1)-th rows and 0-th to (m−1)-th columns. In the present embodiment, each pixel is rendered from pixel data of three primary colors (RGB), and each piece of pixel data is 10-bit data. The pixel array unit 10 outputs pixel data on a row-by-row basis under control exercised by the control circuit 42.

The image processing unit 20 temporarily stores the pixel data output from the pixel array unit 10 in the memory unit 41 to perform a correction process on the pixel data. The memory unit 41 is constituted by one or more SRAMs, and the pixel data output from the pixel array unit 10 is stored in the memory unit. The memory unit 41 of the present embodiment is constituted by four SRAMs.

FIG. 2 is an illustration showing a configuration of the memory unit 41 of the present embodiment. The memory unit 41 has four SRAMs, i.e., SRAM 0 to SRAM 3. As shown in FIG. 2, in each of the SRAMs, an address is allocated to each piece of image data to be stored according to the size of the data. In the present embodiment, since each piece of image data is 10-bit data, ten storage elements are used for storing one piece of image data, and one address is therefore assigned to every ten storage elements. In the present embodiment, a defect of a storage area of the memory unit 41 is detected and relieved as will be described later on an address-by-address basis. In the following description, for the sake of convenience, the term "SRAM" or "SRAMs" will be used to refer to arbitrary one of the SRAMs 0 to 3 or to refer to all of the SRAMs collectively.

In the following description, R (red) pixel data output from the pixel in an n-th row and an m-th column of the pixel array unit will be represented by "Rnm", and G (green) pixel data output from the pixel in the n-th row and the m-th column will be represented by "Gnm".

FIG. 2 shows how pixel data R00 to R09 are stored in addresses 0 to 2 of the SRAMs. Similarly, pixel data R10 to R19 are stored using addresses 3 to 5 of the SRAMs. Further, pixel data G00 to G09 are stored using addresses 6 to 8 of the SRAMs, and pixel data G10 to G19 are stored using addresses 9 to 11 of the SRAMs. Pixel data of respective rows of the pixel array unit 10 are stored in the memory unit 41 in a predetermined order, and the data can therefore be efficiently read out from the memory unit 41 and written in the same.

The pixel array unit 10 and the image processing unit 20 are connected to the control circuit 42, and the circuit controls the solid-state imaging device 100 as a whole. The control interface 43 is an interface section which employs $I^2C$ interface. The control interface 43 is used for transmission and reception of information between an external apparatus connected to the solid-state imaging device 100 and the control circuit 42.

The image interface 44 is an interface section for outputting image data output from the image processing unit 20 to the outside of the device. In the present embodiment, image data are output to the outside using a differential interface such as LVDS (low voltage differential interface).

[1-2. Configuration of Image Processing Unit]

A configuration of the image processing unit 20 of the solid-state imaging device 100 according to the present embodiment will now be specifically described.

As shown in FIG. 1, the image processing unit 20 includes a memory control section 31 which controls writing and reading of data in and from the memory unit 41 and a correction process portion 32 which performs predetermined correction processes on image data output from the pixel array unit 10. The image processing unit 20 having such a configuration temporarily stores pixel data output from the pixel array unit 10 in the memory unit 41. The pixel data are read out from the memory unit 41, and the correction process portion 32 performs the predetermined correction processes on the pixel data.

The correction process portion 32 reads out pixel data stored in the memory unit 41 to perform the predetermined correction processes on the pixel data. For example, the correction processes include noise elimination, contour enhancement, focus adjustment, white balance adjustment, gamma correction, and contour correction.

The image processing unit 20 includes a synchronization code adding portion 33 for generating pixel data added with synchronization codes. Pixel data which have received the correction process at the correction process portion 32 are output as image data via the synchronization code adding portion 33.

The synchronization code adding portion 33 adds a synchronization code for each image frame of image data input to the same, whereby image data are generated. FIG. 3 shows an exemplary data structure of image data generated by the synchronization code adding portion 33. As shown in FIG. 3, an SOF (Start of Frame) header is added at the beginning of image data of the first line of the frame, and an SOL (Start of Line) header is added at the beginning of image data of each of the second and subsequent lines. An EOL (End of Line) header is added at the end of image data of each line except image data of the last line. An EOF (End of Frame) header is added at the end of image data of the last line.

The synchronization code adding portion 33 sequentially outputs the image data on a line-by-line basis starting with the SOF header that is data at the beginning of the first line and terminates the data output by outputting the EOL header that is data at the end of the last line. The synchronization code adding portion 33 outputs no data during a predetermined period starting when the output of data of each line is finished and ending when the output of image data of the next line is started. Such a period is referred to as "horizontal blanking (H blanking) period". The synchronization code adding portion 33 outputs no data during a predetermined period starting when the output of one piece of image data is finished and ending when the next piece of image data is started. Such a period is referred to as "vertical blanking (V blanking) period".

The above-described configuration of the image processing unit 20 allows the solid-state imaging device 100 to output image data generated based on image data output from the pixel array unit 10 to the outside. In the following description, the operation of outputting image data generated based on image data output from the pixel array unit 10 may be referred to as "normal operation mode".

The image processing unit 20 according to the present embodiment performs a process of detecting a defect of the memory unit 41 and a process of relieving the defect in the above-described normal operation mode under control exercised by the control circuit 42. In the present embodiment, the solid-state imaging device 100 includes a defect detecting section 50 and a defect relieving section 60 to perform the defect detecting process and the defect relieving process, respectively.

[1-3. Configuration of Defect Detecting Section]

As shown in FIG. 1, the defect detecting section 50 includes a pixel data holding portion 51 for detecting a defect in which pixel data output from the pixel array unit 10 is stored and a detector 52 which compares the pixel data thus stored and pixel data read out from the memory unit 41 and outputting the result of the comparison.

Pixel data read out from the pixel array unit 10 and written in the memory unit 41 by the memory control section 31 is input to the defect detecting section 50 through a data bus 35 and stored in the pixel data holding portion 51 for detecting a defect. On the other hand, pixel data read out from the memory unit 41 by the memory control section 31 is input to the defect detecting section 50 through a data bus 36. In the description of the present embodiment, the data bus 35 used for storing pixel data in the memory unit 41 and the data bus 36 used for reading pixel data from the memory unit 41 are described as separate buses for the sake of convenience. However, the data bus 35 and the data bus 36 are physically one and the same bus. The detector 52 compares the image data read out from the memory unit 41 by the memory control section 31 and input thereto through the data bus 36 with the pixel data stored in the pixel data holding portion 51 for detecting a defect.

For example, when the memory control section 31 writes pixel data "R00" in the address "0" of the SRAM 0, the pixel data "R00" is also stored in the pixel data holding portion 51 for detecting a defect. When the memory control section 31 reads out the pixel data "R00" stored in the address "0" of the SRAM 0 thereafter, the pixel data is input to the detector 52 through the data bus 36. At this time, since the pixel data holding portion 51 for detecting a defect has the pixel data "R00" stored therein, the pixel data "R00" is also input to the detector 52. Therefore, the detector 52 compares the pixel data read out from the address "0" of the SRAM 0 with the pixel data output from the pixel data holding portion 51 for detecting a defect.

As thus described, the detector 52 compares pixel data to be written in the memory unit 41 with pixel data which has been written in the memory unit 41. Thus, detection can be carried out by checking whether any defect has occurred in the storage area of the SRAM where the pixel data has been stored.

Specifically, when the two pieces of pixel data coincide with each other, the detector 52 determines that no defect has occurred in the storage area where the image data has been stored. When the two pieces of pixel data do not coincide with each other, the detector 52 determines that a defect has occurred in the storage area where the pixel data has been stored. The result of the detection carried out by the defect detecting section 50 is output to the defect relieving section 60 which will be described later through a bus 34.

As thus described, the same pixel data as that written in the memory unit 41 is temporarily written in the defect detecting section 50, and the pixel data is thereafter read out from the memory unit 41 and compared with the temporarily stored pixel data, whereby any defect in the storage area of the memory unit 41 can be detected.

FIG. 4 shows a specific configuration of the defect detecting section 50. While the defect detecting section 50 is provided in association with each of the SRAMs in the present embodiment, only one of the defect detecting sections 50 will be described below. As shown in FIG. 4, pixel data output from the pixel array unit 10 is written in an SRAM, and the data is also stored in the associated pixel data holding portion 51 for detecting a defect through the data bus 35. For example, the pixel data holding portion 51 for detecting a defect is formed by ten D flip-flops, and 10-bit image data can be stored in the same.

The image data is read out from the memory unit 41 and output to the detector 52 through the data bus 36. At the same time, the pixel data stored in the pixel data holding portion 51 for detecting a defect is also output to the detector 52. The detector 52 has an EOR (Exclusive OR) gate 53 provided in association with each of 10 bits and an OR gate having ten inputs and one output which is not shown. The output of each EOR gate 53 is input to the OR gate, and the output of the OR gate constitutes the output of the detector 52.

Therefore, when all bits of (10-bit) image data read out from the memory unit 41 agree with respective bits of (10-bit) data output from the image data holding portion 51 for detecting a defect, the detector 52 outputs "0". The detector outputs "1" when whichever couple of bits disagree with each other. That is, when image data read out from an SRAM disagrees with pixel data output from the pixel data holding portion 51 for detecting a defect, the detector 52 determines that there is a defect in the storage area of the SRAM where the pixel data has been written. The detector 52 outputs "0" when image data is written in an SRAM by the memory control section 31.

As thus described, the defect detecting section 50 outputs "1", which is a defect detection signal, when a defect has been detected in a storage area of an SRAM and outputs "0", which is a no-defect detection signal, when no defect has been detected. The defect detection signal and the no-defect detection signal are input to the defect relieving section 60 through the bus 34. Pixel data stored in the pixel data holding portion 51 for detecting a defect is output to the defect relieving section 60 through a data bus 37.

[1-4. Configuration of Defect Relieving Section]

The defect relieving section 60 relieves pixel data read out from a storage area where a defect has been detected by substituting correct pixel data for the defective data. As shown in FIG. 1, the defect relieving section 60 includes a control portion 62 controlling the defect relieving section 60 as a whole, a defective address holding portion 61 for storing a defective address of an SRAM, and a pixel data holding portion 63 for relieving a defect in which pixel data to be written in a defective address is stored. The defect relieving section 60 also includes a selector 64 which selects either pixel data read out from the memory unit 41 by the memory control section 31 or pixel data stored in the pixel data holding portion 63 for relieving a defect and outputs the selected pixel data to the correction process portion 32. The operation of the selector 64 is controlled by a control signal input from the control portion 62 through a bus 38. The selector 64 serves as a selecting section.

An address bus 39 is connected to the defective address holding portion 61, and the address which is being output from the memory control section 31 to the address bus 39 when a defect detection signal is input from the defect detecting section 50 is stored in the defective address holding portion 61. When the memory control section 31 reads out pixel data from a defective address of an SRAM, a defect detection signal is output from the defect detecting section 50. Thus, the defective address is stored in the defective address holding portion 61. When a defect detection signal is input from the defect detecting section 50, image data input from the defect detecting section 50 through the data bus 37 (image data stored in the pixel data holding portion 51) is stored in the pixel data holding portion 63 for relieving a defect.

As thus described, when the defect detecting section 50 detects a defect, the defect relieving section 60 can temporarily hold the defective address and pixel data to be written in the defective address. As will be described later, when the memory control section 31 reads out pixel data in a defective address of an SRAM, pixel data temporarily stored as described above can be output to the correction process portion 32 to relieve the defect.

After a defective address is stored, when each piece of pixel data of pixel array unit 10 is written in the memory unit 41, the defect relieving section 60 determines whether a defect has occurred in the respective storage area in which the pixel data is written. The pixel data holding portion 63 for relieving a defect temporarily holds the same pixel data to be written in a storage area which has been determined as having a defect. The pixel data held by the pixel data holding portion 63 for relieving a defect is output to the correcting process portion 32 instead of the pixel data in the storage area. Thus, the defect relieving section 60 can relieve a defect in the memory unit 41.

Figure 5:
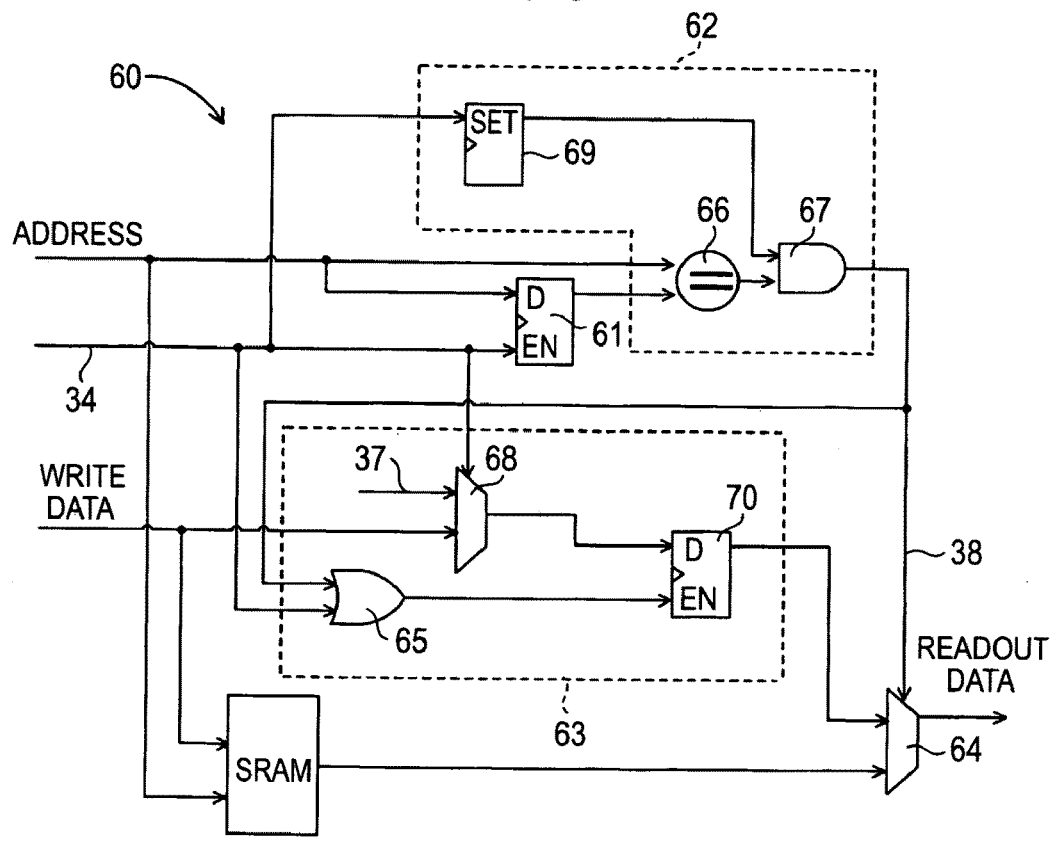
FIG. 5 is a diagram showing a specific configuration of a control section and a defect relieving section.

FIG. 5 shows a specific configuration of the defect relieving section 60. While the defect relieving section 60 is provided in association with each of the SRAMs in the present embodiment, only one of the defect relieving sections 60 will be described below. A plurality of the defect relieving sections 60 may be provided, and N defects which have occurred in an SRAM can be relieved when N defect relieving sections 60 are provided.

As shown in FIG. 5, the control portion 62 includes a comparing part 66, an AND gate 67 and a defect detection flag holding part 69. The pixel data holding portion 63 for relieving a defect is constituted by an OR gate 65, a selector 68, and a data holding part 70. Each of the features will be described later in detail.

For example, the defective address holding portion 61 is constituted by K D flip-flops, and the portion includes an enable terminal, a data input terminal, and a data output terminal. The quantity "K" of the D flip-flops may be appropriately set depending on the address length of the associated SRAM. For the sake of convenience, only one D flip-flop is shown in FIG. 5. The defective address holding portion 61 holds data input to the data input terminal when "1" is input to the enable terminal. That is, the defective address holding portion 61 holds a defective address of the SRAM. The defective address is also output to a comparing part 66.

For example, the comparing part 66 includes K AND gates each having two inputs and one output. The comparing part 66 compares an address output from the memory control section 31 (specifically, the address of pixel data read out or written by the memory control section 31) and the defective address output from the defective address holding portion 61. When the two addresses agree with each other, the comparing part 66 outputs "1".

The defect relieving section 60 includes the defect detection flag holding part 69. The defect detection flag holding part 69 holds "1" when a defect detection signal is input from the detect detecting section 50 through the bus 34. The information held by the part is output to the AND gate 67.

The AND gate 67 is an AND element having two inputs and one output, and the signal from the defect detection flag holding part 69 and the signal from the defective address holding portion 61 are input to the gate. As a result, when the memory control section 31 is accessing a defective address in the SRAM, "1" is output from the AND gate 67.

The selector 68 of the pixel data holding portion 63 for relieving a defect selects and outputs either pixel data output from the pixel data holding portion 51 for detecting a defect or pixel data written in the memory unit 41. The selector 68 outputs the pixel data output from the pixel data holding portion 51 for detecting a defect when "1" is input to the same as a control signal. Otherwise, the selector outputs the pixel data written in the memory unit 41. The pixel data output from the pixel data holding portion 51 for detecting a defect is pixel data which is to be written in the SRAM by the memory control section 31 when a defect is detected.

The OR gate 65 is an OR element having two inputs and one output, and the signal from the AND gate 67 and the signal from the detector 52 are input to the gate. Thus, the gate outputs "1" when a defect detection signal is output or when a defective address in the SRAM is accessed by the memory control section 31.

Figure 6:
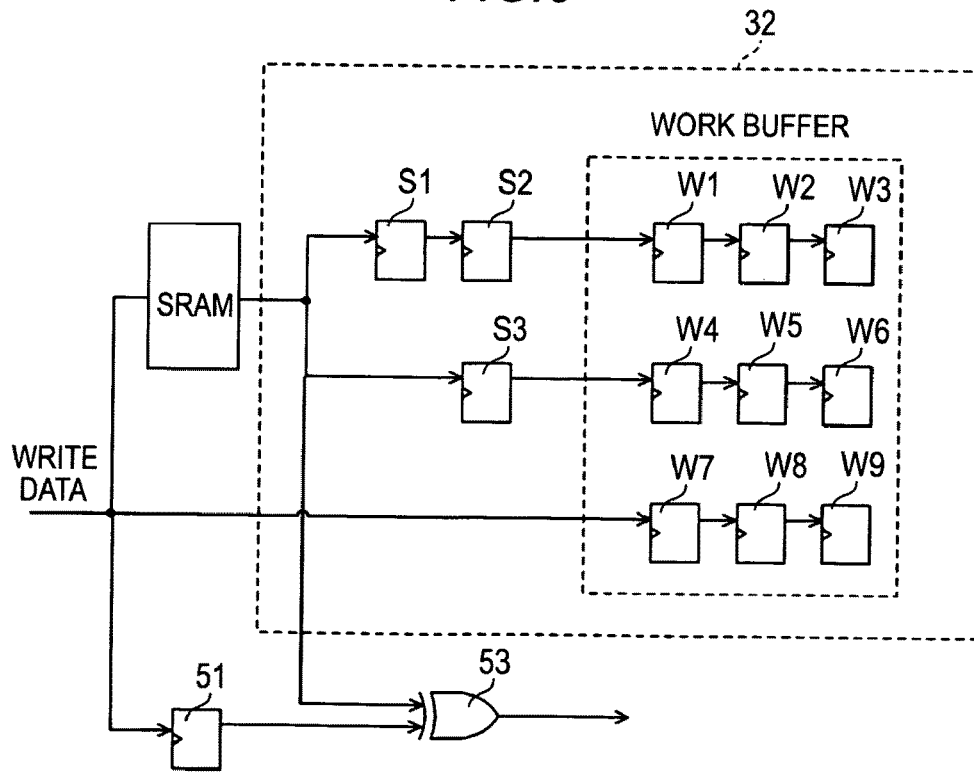
FIG. 6 is a diagram showing a specific configuration of a correction process section.

For example, the data holding part 70 is constituted by ten D flip-flops, and each of the D flip-flops includes an enable terminal, a data input terminal, and a data output terminal. For the sake of convenience, only one of the D flip-flops is shown in FIG. 6. The data holding part 70 holds pixel data to be written in a defective address in the SRAM by the memory control section 31.

[1-5. Operations of Defect Relieving Section]

Operations of the defect relieving section 60 having the above-described configuration will now be described.

When no defect has been detected yet, "0" is held in the defect detection flag holding part 69. At this time, the output of the AND gate 67 is "0". Therefore, whatever address is stored in the defective address holding portion 61, the pixel data output from the selector 64 is the pixel data read out from the SRAM by the memory control section 31. Since the defect detection flag holding part 69 is provided as thus described, the defect relieving section 60 performs no relieving operation when no defect has been detected yet.

When the memory control section 31 reads out pixel data from a defective address in the SRAM and a defect detection signal is output from the defect detecting section 50 thereafter, "1" is held in the defect detection flag holding part 69, and the defect relieving section 60 is enabled for a relieving operation.

The defect detection signal from the defect detecting section 50 is input to the enable terminal of each D flip-flop of the data holding part 70, and the defective address is held in the defective address holding portion 61. The defective address thus held is output from the output terminal of the D flip-flop.

Further, when a defect detection signal is output from the defect detection section 50, since "1" is input to the OR gate 65, "1" is input to the enable terminal of the pixel data holding portion 63 for relieving a defect, and "1" is also input to the selector 68 at the same time. Therefore, the pixel data stored in the pixel data holding portion 51 for detecting a defect is input to the pixel data holding portion 63 for relieving a defect through the data bus 37 and the selector 68 and stored in the holding portion 63. Thus, pixel data to be written in a defective storage area among storage areas of the SRAM can be held in the pixel data holding portion 63 for relieving a defect.

When the pixel data in the defective storage area is read out by the memory control section 31, the pixel data held in the pixel data holding portion 63 for relieving a defect is output as readout data instead of the pixel data stored in the defective storage area.

A description will now be made on operations performed when a defect has already been detected.

In such a case, "1" is held in the defect detection flag holding part 69, and the defect relieving section 60 is enabled for a relieving operation as described above. Therefore, the control portion 62 outputs "1" when an address in the memory unit 41 accessed by the memory control section 31 agrees with an address stored in the defective address holding portion 61.

A description will now be made on operations performed when pixel data is written in an SRAM.

When pixel data is written in an SRAM by the memory control section 31, the comparing part 66 compares the address in which the pixel data is written with the address in the defective address held in the defective address holding portion 61. When the addresses agree with each other, the comparing part 66 outputs "1". The AND gate 67 also outputs "1". As thus described, when pixel data is written in the storage area in a defective address by the memory control section 31, the control portion 62 outputs "1".

When pixel data is written in the storage area in a defective address by the memory control section 31, the signal "1" is input from the control portion 62 to the OR gate 65, and "1" is therefore input to the enable terminal of the pixel data holding portion 63 for relieving a defect. Since "0" is input to the selector 68 as a control signal, the pixel data to be written in the defective address by the memory control section 31 is held in the data holding part 70. The pixel data held in the data holding part 70 is input to the selector 64.

Operations performed when pixel data is read out from the SRAM will now be described.

When pixel data is read out from the SRAM by the memory control section 31, the comparing part 66 compares the address from which the pixel data is read out with the address in the defective address holding portion 61 and outputs "1" when the addresses agree with each other. The AND gate outputs "1". Thus, when pixel data is read out from the storage area in a defective address by the memory control section 31, the control portion 62 outputs "1".

Since "1" is input to the selector 64 as a control signal, pixel data held in the data holding part 70 is output to the correction process portion 32 as readout data.

That is, when the memory control section 31 reads out pixel data in a defective address of the SRAM, the control portion 62 reads out pixel data from the pixel data holding portion 63 for relieving a defect. Then, the control portion 62 controls the selector 64 to cause it to output the pixel data read out from the pixel data holding portion 63 for relieving a defect to the correction process portion 32. As thus described, the defect relieving section 60 holds pixel data to be written in a defective address of an SRAM by the memory control section 31 and outputs the pixel data thus held to the correction process portion 32 instead of the pixel data written in the defective address of the SRAM.

In the above-described configuration, when a defect has occurred in a storage area of an SRAM, pixel data is held in the pixel data holding portion 63 for relieving. When pixel data is read out from the defective address of the SRAM, the pixel data held in the pixel data holding portion 63 for relieving a defect can be output instead, which allows the storage area having a defect to be relieved.

[1-6. Configuration of Correction Process Portion]

A specific configuration of the correction process portion 32 will now be described. The following description is based on an assumption that the correction process portion 32 performs a noise elimination process on each piece of pixel data. The noise elimination process is performed to eliminate noise from pixel data in a central position using pixel data of eight pixels neighboring the pixel of interest. In the following description, the row (n) on which the pixel to be subjected to noise elimination process resides may be referred to as "center line". The (n−1)-th row and the (n+1)-th row may be referred to as "preceding line" and "succeeding line", respectively.

As shown in FIG. 6, the correction process portion 32 includes save buffers S1 to S3 and work buffers W1 to W9. The save buffers S1 to S3 are used to compensate any shift of timing at which each piece of pixel data is read out from the memory unit 41. The work buffers W1 to W9 are used when the noise elimination process is performed. For example, the save buffers S1 to S3 and the work buffers W1 to W9 are constituted by D flip-flops.

[1-7. Noise Elimination Process]

Details of the nose elimination process will now be described. The process will be described below by describing an instance in which nose is eliminated from R pixel data using storage areas in addresses 0 to 5 in each SRAM. The description equally applies when the process is performed for other storage areas. The following description will focus on pixel data in the first row and the first column of the pixel array unit 10 as a pixel of interest.

The memory control section 31 writes pieces of pixel data on the lines of the pixel array unit 10 in the SRAMs starting with the pixel data in a 0-th column, the pieces of pixel data being sequentially and cyclically written one after another in the SRAM 0 to SRAM 3. The memory control section 31 sequentially and cyclically reads out the pieces of pixel data written in the SRAMs 0 to 3 one after another starting with the pixel data in the 0-th column.

A detailed description will now be made on the reading and writing operations associated with the SRAMs, correction process portion 32, and the pixel data holding portion 51 for detecting a defect. The processes described below are performed by a control part (not shown) of the correction process portion 32 and the memory control section 31. The following description is based on an assumption that pixel data "R00" to "R09" and pixel data "R10" to "R19" have already been stored in the storage areas in the addresses 0 to 5 of the SRAMs 0 to 3.

<Step 1>

Figure 7:
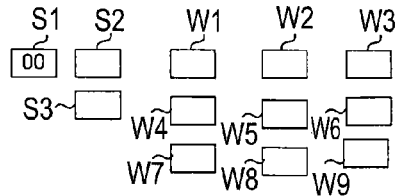
FIG. 7 is an illustration showing orders in which memory reading and writing is performed.
Figure 7:
Figure 7:
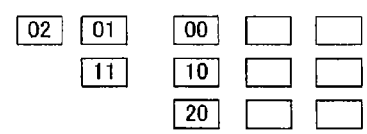
Figure 7:
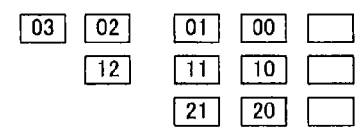
Figure 7:
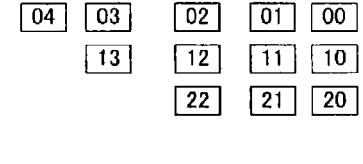
Figure 7:
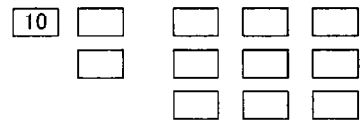
Figure 7:
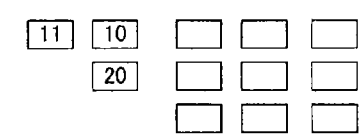
Figure 7:
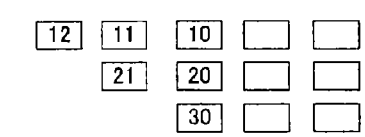
Figure 7:
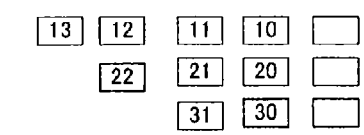

The following process is performed at step 1 as shown in (A) in FIG. 7.

(1) The pixel data "R00" is read out from the address 0 of the SRAM 0 and stored in the save buffer S1.

<Step 2>

Processes (1) to (3) described below are simultaneously performed at step 2 as shown in (B) in FIG. 7.

(1) The pixel data "R00" in the save buffer S1 is transferred to the save buffer S2.

(2) The pixel data "R10" is read out from the address 3 of the SRAM 0 and stored in the save buffer S3.

(3) The pixel data "R01" is read out from the address 0 of the SRAM 1 and stored in the save buffer S1.

<Step 3>

Processes (1) to (7) described below are simultaneously performed at step 3 as shown in (C) in FIG. 7.

(1) The pixel data "R00" in the save buffer S2 is transferred to the work buffer W1.

(2) The pixel data "R10" in the save buffer S3 is transferred to the work buffer W4.

(3) The pixel data "R01" in the save buffer S1 is transferred to the save buffer S2.

(4) The pixel data "R02" is read out from the address 0 of the SRAM 2 and stored in the save buffer S1.

(5) The pixel data "R11" is read out from the address 3 of the SRAM 1 and stored in the save buffer S3.

(6) The pixel data "R20" is written in the address 0 of the SRAM 0.

(7) The pixel data "R20" is written in the work buffer W7.

<Step 4>

Processes (1) to (11) described below are simultaneously performed at step 4 as shown in (D) in FIG. 7.

(1) The pixel data "R00" in the work buffer W1 is transferred to the work buffer W2.

(2) The pixel data "R10" in the work buffer W4 is transferred to the work buffer W5.

(3) The pixel data "R20" in the work buffer W7 is transferred to the work buffer W8.

(4) The pixel data "R01" in the save buffer S2 is transferred to the work buffer W1.

(5) The pixel data "R11" in the save buffer S3 is transferred to the work buffer W4.

(6) The pixel data "R02" in the save buffer S1 is transferred to the save buffer S2.

(7) The pixel data "R03" is read out from the address 0 of the SRAM 3 and stored in the save buffer S1.

(8) The pixel data "R12" is read out from the address 3 of the SRAM 2 and stored in the save buffer S3.

(9) The pixel data "R21" is written in the address 0 of the SRAM 1.

(10) The pixel data "R21" is written in the work buffer W7.

(11) The pixel data "R20" is read out from the address 0 of the SRAM 0 and stored in the data holding portion 51 for detecting a defect.

<Step 5>

Processes (1) to (15) described below are simultaneously performed at step 5 as shown in (E) in FIG. 7.

(1) The pixel data "R00" in the work buffer W2 is transferred to the work buffer W3.

(2) The pixel data "R10" in the work buffer W5 is transferred to the work buffer W6.

(3) The pixel data "R20" in the work buffer W8 is transferred to the work buffer W9.

(4) The pixel data "R01" in the work buffer W1 is transferred to the work buffer W2.

(5) The pixel data "R11" in the work buffer W4 is transferred to the work buffer W5.

(6) The pixel data "R21" in the work buffer W7 is transferred to the work buffer W8.

(7) The pixel data "R02" in the save buffer S2 is transferred to the work buffer W1.

(8) The pixel data "R12" in the save buffer S3 is transferred to the work buffer W4.

(9) The pixel data "R03" in the save buffer S1 is transferred to the save buffer S2.

(10) The pixel data "R04" is read out from the address 1 of the SRAM 0 and stored in the save buffer S1.

(11) The pixel data "R13" is read out from the address 3 of the SRAM 3 and stored in the save buffer S3.

(12) The pixel data "R22" is written in the address 0 of the SRAM 2.

(13) The pixel data "R22" is written in the work buffer W7.

(14) The pixel data "R20" is read out from the pixel data holding portion 51 for detecting a defect to perform the defect detecting process and the defect relieving process (if necessary).

(15) The pixel data "R21" is read out from the address 0 of the SRAM 1 and stored in the pixel data holding portion 51 for detecting a defect.

The above-described operations are performed to implement the process of eliminating noise from the pixel data in the first row and the first column, in which the memory control section 31 reads out the pixel data in the 0-th row and the 0-th to 2nd columns, the pixel data in the 1st row and the 0-th to 2nd columns, and the pixel data in the 2nd row and the 0-th to 2nd columns, from the respective SRAMs. The pieces of pixel data thus read out are written in the work buffers W1 to W9, whereby the process of eliminating noise from the pixel data in the first row and the first column can be carried out. Further, the pieces of pixel data written in the SRAMs are read out to be written into the work buffers, and the pixel data are also read out to detect any defect in the storage areas where the data are written.

As shown in FIG. 7, when the noise elimination process is performed on the pixel data in the first row, the addresses 0 to 2 of the SRAMs are used to read out the pixel data of the 0-th row (preceding line) and to write the pixel data of the first row (succeeding line). The addresses 3 to 5 of the SRAMs are used to read out the pixel data of the pixel of interest and the pixels neighboring the pixel of interest on the left and right sides thereof (center line).

When the noise elimination process is performed on the pixel data in the second row, the addresses 3 to 5 of the SRAMs are used to read out the pixel data of the first row (preceding line) and to write the pixel data of the second row (succeeding line). The addresses 0 to 2 of the SRAMs are used to read out the pixel data of the pixel of interest and the pixels neighboring the pixel of interest on the left and right sides thereof (center line) (see (F) to (I) in FIG. 7).

Let us assume that storage areas of the SRAMs are used to read pixel data in the line preceding the line of interest (L-th row) and to write pixel data in the line succeeding the line of interest at a process of eliminating noise from pixel data in the L-th row. In this case, at a process of eliminating noise from pixel data in the (L+1)-th row, the above-mentioned storage areas are used to read out pixel data on the center line. That is, the usage of a storage area of each SRAM changes alternately each time the line under the noise elimination process is shifted one place. The data written in each storage area is read out three times in total to serve as pixel data forming part of a preceding line, pixel data forming part of a center line, and pixel data forming part of detecting defects.

The solid-state imaging device 100 operates as described above to perform a noise elimination process in the normal mode of operation while performing a defect detecting process and a defect relieving process on each of the SRAMs. Since the SRAMs are read out and written in the above-described order, the capacity of the SRAMs required for the noise elimination process can be kept small. The operations of reading and writing the four SRAMs are performed simultaneously. More specifically, the operation of reading out pixel data from three SRAMs and the operation of writing data of the pixel array unit 10 in the remaining one SRAM are simultaneously carried out. The control process portion 32 performs the process of correcting pixel data based on pixel data read out from two SRAMs and one piece of data supplied from the pixel array unit 10. A defect in the memory unit 41 of the solid-state imaging device 100 can be detected even after the device is shipped.

In the above-described embodiment, pixel data written in an SRAM is read out at the next cycle of operation to detect a defect in the storage areas thereof. However, the readout operation may take place M (M≧2) cycles later. In this case, the pixel data holding portion 51 for detecting a defect is constituted by a plurality of cascade-connected D flip-flops. Since the plurality of D flip-flops are used to adjust the timing of writing and reading of data in and from the SRAMs, the timing of defect detection can be easily controlled.

2. Second Embodiment

A solid-state imaging device according to a second embodiment of the invention will now be described. In the solid-state imaging device of the first embodiment, a defect detecting process and a defect relieving process are carried out using pixel data read out from the pixel array unit 10. In the present embodiment, a defect detecting process and a defect relieving process are carried out using test data.

Four types of test data or pieces of unit data each having 10 bits, i.e., data [1111111111], [0000000000], [1010101010], and [0101010101] are used as data for testing a solid-state imaging device 100 according to the present embodiment.

Specifically, a memory unit 41 is tested using four types of test data, i.e., test data formed by consecutive 0s, test data formed by consecutive 1s, test data formed by consecutive pairs of "0" and "1" alternating in the order listed, and test data formed by consecutive pairs of "1" and "0" alternating in the order listed.

The test data are generated by a test pattern generating section (not shown) provided in an image processing unit 20. The test pattern generating section outputs the test data to SRAMs of the memory unit 41 in the order of "0000000000", "0000000000", "1111111111", "1111111111", "0101010101", "0101010101", "1010101010", and "1010101010". A memory control section 31 writes the test data sequentially output from the test pattern generating section and reads out the test data thus written.

Thus, writing of "0" over "0", writing of "1" over "0", writing of "1" over "1", and writing of "0" over "1" take place in each storage area of the memory unit 41. Thereafter, data is read from each storage area of the memory unit 41. Each storage area of the memory unit 41 is written and read eight times.

Such writing and reading operations can be carried out utilizing blanking periods (see FIG. 3) in the normal mode of operation.

A process of detecting a defect in an SRAM and a process of relieving the defect can be carried out by a defect detecting section 50 and a defect relieving section 60. Information indicating which of the SRAMs and which of the storage areas have a defect may be output as a control signal through a control interface.

As described above, it is possible to carry out a defect detecting process and a defect relieving process on SRAMs using test patterns according to the present embodiment. In addition, since operations associated with the processes are performed during blanking periods, the defect detecting process and the defect relieving process can be carried out in the normal mode of operation. Further, test data written in the SRAMs may be read out after a predetermined time passes, which makes it possible to detect even a defect which becomes apparent as time passes.

In the present embodiment, writing of "0" over "0", writing of "1" over "0", writing of "1" over "1", and writing of "0" over "1" can be carried out in four test patterns in each of the storage areas of the memory unit 41. Since the test utilizes only the four types of unit data "0000000000", "1111111111", "0101010101", and "1010101010", the scale of the circuit of the test pattern generating section can be minimized.

When a test pattern generating circuit for other purposes is used according to the present embodiment, there is no need for providing a test pattern generating section separately. Thus, any increase in the circuit scale can be avoided to keep the design cost low.

3. Modifications

While embodiments of the invention have been specifically described above, the invention is not limited to the above-described embodiments, and various modifications may be made based on the technical idea of the invention.

For example, addresses in each of the SRAMs may be assigned according to the size (30 bits) of pixel data to be stored. Reading and writing of the SRAMs and a process of correcting the SRAMs may be performed using such a pixel data size as a unit.

While four SRAMs are used in the above-described embodiment, the invention is not limited to such a quantity of SRAMs. When m+1 (m is 3 or a greater integer) SRAMs are provided, the memory control section 31 may read pixel data from m SRAMs among the m+1 SRAMs and write pixel data in the remaining one SRAM simultaneously. The control process portion 32 may perform the process of correcting pixel data based on pixel data read out from m−1 SRAMs and a piece of data supplied from the pixel array unit.

For example, synchronization codes may be added by the control process portion 32, and pixel data may be output through the image interface 44 without the intervention of the synchronization code adding section 33.

The above-described first and second embodiments are solid-state imaging devices utilizing SRAMs. However, the invention may be applied to other types of storage devices such as DRAMs. The invention may be applied to data processing apparatus including a storage device having audio data and motion picture data stored therein.

The present application contains subject matter related to that disclosed in Japanese Priority Patent Application JP 2009-250010 filed in the Japan Patent Office on Oct. 30, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A solid-state imaging device comprising:
a pixel array unit formed by two-dimensionally disposing a plurality of pixels each having a photoelectric conversion portion;
one or more SRAMs;
a memory control section controlling writing of pixel data sequentially output from the pixel array unit into the SRAM and controlling readout of the pixel data from the SRAM;

a correction process section performing a process of correcting the pixel data read from the SRAM by the memory control section;

a defect detecting section detecting a defective address in the SRAM; and a defect relieving section holding pixel data to be written in the defective address of the SRAM by the memory control section and outputting the pixel data held therein to the correction process section instead of the pixel data which has been written in the defective address of the SRAM, wherein the defect detecting section includes a pixel data holding portion used for detecting a defect which temporarily holds the pixel data to be written in the SRAM, and a detector detecting the defective address of the SRAM when the pixel data read from the SRAM and the pixel data read from the pixel data holding portion for detecting a defect do not agree with each other.

2. A solid-state imaging device according to claim 1, comprising a plurality of the SRAMs, wherein the defect detecting section and the defect relieving section are provided in association with each of the SRAMs.

3. A solid-state imaging device according to claim 2, comprising m+1 (m is 3 or a greater integer) SRAMs, wherein the memory control section reads pixel data from m SRAMs among the m+1 SRAMs and writes pixel data in the remaining one SRAM simultaneously; and the correction process section performs the correction process based on pixel data read from m−1 SRAMs and one piece of pixel data supplied from the pixel array unit.

4. A solid-state imaging device according to claim 3, wherein:

the memory control section writes pieces of pixel data of lines of the pixel array unit in the m+1 SRAMs starting with pixel data in a 0-th column, the pieces of data being written one after another sequentially and cyclically in the first to (m+1)-th SRAMs; and the memory control section reads out the pieces of pixel data written in the m+1 SRAMs starting with the pixel data in the 0-th column, the pieces of data being read out one after another sequentially and cyclically from the first to (m+1)-th SRAMs.

5. A solid-state imaging device according to any one of claims 1 to 4, wherein the detector of the defect detecting section outputs a defect detection signal to the defect relieving section when the pixel data read out from the SRAM and the pixel data read out from the pixel data holding portion for detecting a defect do not agree with each other; and the defect relieving section includes a defective address holding portion holding the address in the SRAM which is being read by the memory control section when the defect detection signal is output by the defect detecting section as a defective address;

a pixel data holding portion for relieving a defect which holds pixel data to be written in the defective address of the SRAM by the memory control section, a selecting portion selectively outputting the pixel data read out from the SRAM or the pixel data read out from the pixel data holding portion for relieving a defect to the image processing unit, and a control portion reading the pixel data in the pixel data holding portion when pixel data in the defective address of the SRAM is read out by the memory control section and controlling the selecting portion to cause it to output the pixel data read out from the pixel data holding portion to the correction process section.

6. A data processing device comprising:

an SRAM;

a memory control section controlling writing of pixel data into the SRAM and readout of the pixel data from the SRAM;

a defect detecting section detecting a defective address in the SRAM; and a defect relieving section holding pixel data to be written in the defective address of the SRAM by the memory control section and outputting the pixel data held therein to the correction process section instead of the pixel data which has been written in the defective address of the SRAM, wherein the defect detecting section includes a pixel data holding portion for detecting a defect which temporarily holds pixel data to be written in the SRAM, and a detector detecting a defective address of the SRAM when pixel data read out from the SRAM and pixel data read out from the pixel data holding portion for detecting a defect do not agree with each other.

* * * * *